Aug. 20, 1968     W. C. HYND     3,397,976
FLOATING REFRACTORY DRAW BAR
Filed July 24, 1964
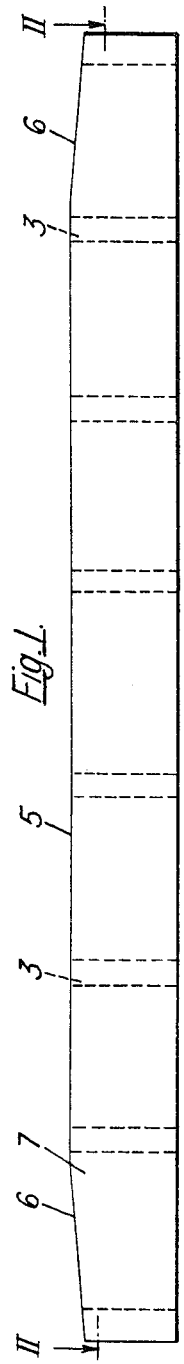
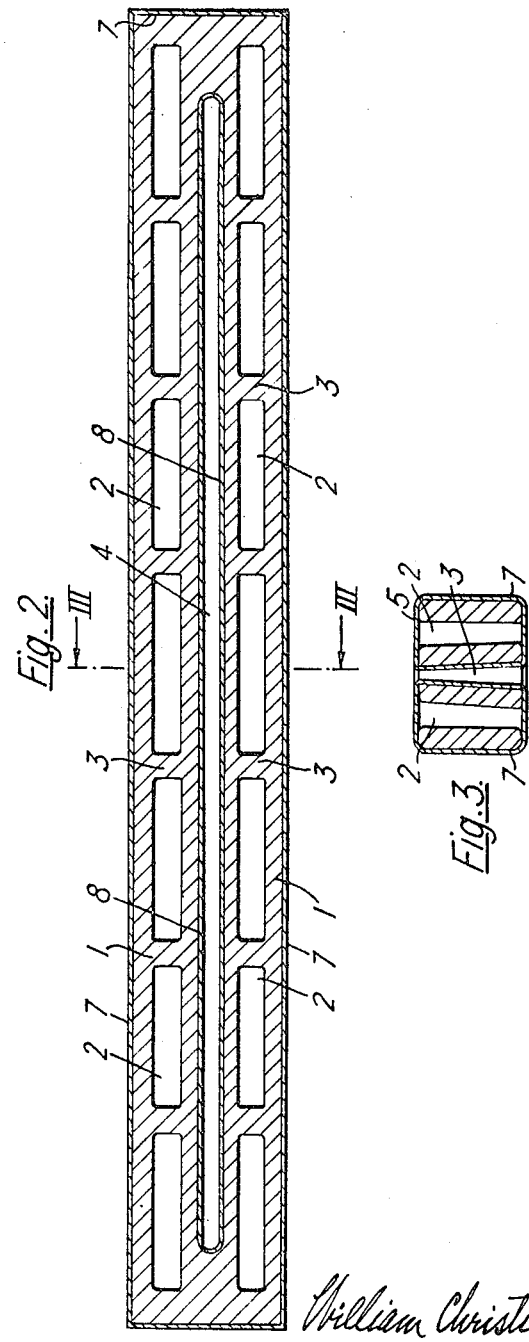
William Christie Hynd
Inventor
By Morrison, Kennedy & Campbell
Attorneys

United States Patent Office 3,397,976
Patented Aug. 20, 1968

3,397,976
FLOATING REFRACTORY DRAW BAR
William Christie Hynd, Liverpool, England, assignor to Pilkington Brothers Limited, Liverpool, England, a corporation of Great Britain
Filed July 24, 1964, Ser. No. 384,939
Claims priority, application Great Britain, July 29, 1963, 30,045/63
2 Claims. (Cl. 65—344)

ABSTRACT OF THE DISCLOSURE

A refractory draw bar for use in glass making, which contains sealed cavities providing buoyancy in molten glass and encased in a glass-resistant metal.

---

This invention relates to refractory elements and in particular to refractory elements for use in glass making apparatus.

It is a main object of the present invention to provide a new refractory element construction which is especially suitable for refractory elements which are to be submerged in molten glass, or are supported on the surface of molten glass.

According to the invention there is provided a refractory element comprising a body of refractory material encased with a skin of a metal which is resistant to molten glass, which body is so formed that it has an effective specific gravity of the same order as molten glass.

The external shape of the refractory element is determined by the function which it has to perform in the glass manufacturing process. For example the element may be shaped for use as a submerged shut-off gate in a drawing chamber, or it may be a specially shaped submerged drawbar located in a drawing chamber beneath the line of draw of the glass.

In order to give the element the desired buoyancy the refractory body is preferably a hollow body and the internal hollow shape of the element is designed, according to the invention, so that the effective specific gravity of the element is substantially the same as that of molten glass, and the element can be located in a submerged position in molten glass or just breaking the surface of molten glass without any appreciable force being necessary for supporting the element, and without the element being strained by the pressure of molten glass acting upwardly on it.

When a large refractory element according to the invention is required the design of the internal shape of the refractory body also has to take account of the required structural strength of the element. Preferably according to the invention the hollow refractory body is formed with a plurality of internal cavities. The webs between the cavities give the desired strength to the element.

Any of the well known refractory materials used in glass making apparatus may be employed, and in a preferred embodiment of the invention the refractory material is a material selected from the group consisting of alumino-siliceous fireclays, fused silica materials and electro-cast corundum/zirconia materials, and the metal skin is a skin of molybdenum.

Alternatively for some applications the metal skin may be a skin of platinum.

In order that the invention may be more clearly understood some embodiments thereof will now be described, by way of example, with reference to the accompanying drawings in which:

FIGURE 1 is a side elevation of a drawbar constructed according to the invention, FIGURE 2 is a section on line II—II of FIGURE 1, and FIGURE 3 is a section on line III—III of FIGURE 2.

In glass making apparatus, in particular apparatus for the manufacture of flat glass, there are some refractory elements of the apparatus which are either submerged in, or are supported on the surface of molten glass. In order to prevent the molten glass from becoming contaminated by the refractory material from which the elements are made, the refractory elements are sometimes sheathed in platinum or a platinum alloy which is resistant to attack by molten glass.

Such refractory elements are generally of massive construction, and when submerged in molten glass are supported at their ends, so that they are subject to considerable bending stresses. Such is the case for example of a submerged drawbar in a drawing chamber from which glass in sheet form is drawn vertically, or of a bridge submerged in a channel through which molten glass is flowing.

In order to simplify the supporting of such elements and to relieve the problems resulting from the setting-up of strains in the elements, refractory elements according to the invention are constructed so that they have an effective specific gravity of the same order as molten glass and are thus buoyant in molten glass.

As an example of the construction of such a refractory element a drawbar for use in a drawing chamber is illustrated in FIGURES 1 to 3. The drawbar would be submerged in the drawing chamber beneath the line of draw of the glass.

The drawbar 1 illustrated in the figures is of rectangular form and is made for example of an alumino-siliceous fireclay material. The drawbar is hollow, being formed with a plurality of cavities 2 of rectangular form running vertically through the drawbar. These cavities 2 are separated from each other by webs 3 which are of a thickness to give the desired structural strength to the drawbar.

There is a central vertical slot 4 formed in the drawbar in well-known manner. The drawbar 1 is submerged in the molten glass and is supported at its ends in the side walls of the drawing chamber. The slot 4 is of tapering form as shown in FIGURE 3, and the top surface 5 of the drawbar slopes downwardly towards its ends as shown at 6 in FIGURE 1.

The drawbar is encased in a skin 7 of a metal which is resistant to attack by molten glass, for example molybdenum or platinum or a suitable alloy of either of these metals. Molybdenum plates, for example, may be fixed to the hollow drawbar to form the complete skin 7 which covers the ends of the cavities 2, as shown in FIGURE 3, thus sealing the cavities in the drawbar, and includes a lining 8 for the slot 4. The top and bottom of the slot are open.

The shape and size of the cavities 2 take account, not only of the density of the refractory material 1, but also the density of the metal skin 7, so that the effective specific gravity of the complete drawbar is substantially the same as that of the molten glass, and the desired buoyancy is achieved.

A drawbar according to the invention thus need only be held lightly at its ends in mountings in the side walls of the drawing chamber, and when the effective specific gravity of the composite drawbar is equal to the specific gravity of the molten glass the weight of the drawbar in the molten glass in which it is submerged is practically negligible.

Refractory elements according to the invention will normally be specially shaped to perform a specific function, for example a bridge or dividing vane of refractory material constructed according to the invention may be mounted in a channel or tank where there is a return flow of molten glass, to segregate the forward flow of molten glass from the return flow in a region where the forward flow is stirred. The dividing vane is so constructed that its specific gravity is the same as that of the molten glass in the neutral plane separating the two flows so that the effective weight of the hollow refractory bridge clad with molybdenum, for example, submerged in the molten glass in the neutral plane is such that a very simple end mounting of the bridge is possible. A long bridge, for example about 12 feet long, can be supported easily without any risk of distortion of the central region of the bridge, so that the exact required position of the central region of the bridge in the neutral plane of the flow pattern of the molten glass can be maintained with accuracy.

Other refractory materials may be employed for example fused silica materials or electrocast corundum/zirconia materials. If the refractory material used for the refractory element is a low density material, then the desired effective specific gravity of the element may be achieved by specially shaping the element without there being any internal cavities in the element.

Because of the metal skin there is no danger of refractory contamination of the glass. Molybdenum provides a particularly strong metal skin which is not subject to distortion.

The invention also comprehends apparatus for use in the manufacture of flat glass including one or more refractory elements as described above.

I claim:

1. A draw bar for use in the vertical drawing of flat glass, comprising an elongated body of refractory material formed with a plurality of internal cavities which are arranged in rows parallel to the longer axis of the draw bar and which extend through the thickness of said body, and also formed with a central slot extending through the thickness of the body along said axis, the body being encased with a skin of a metal which is resistant to molten glass, which skin lines the central slot, leaving it open, and closes off the ends of each of said internal cavities, said drawbar having an effective specific gravity which is substantially the same as that of molten glass, and being locatable in a submerged position in molten glass or just breaking the surface of molten glass without any appreciable force being necessary for supporting the drawbar and without the drawbar being strained by the pressure of molten glass acting upwardly upon it.

2. A refractory element according to claim 1, wherein the refractory material is a material selected from the group consisting of alumino-siliceous fire-clays, fused silica materials and electrocast corundum/zirconia materials, and the metal skin is a skin of molybdenum.

References Cited
UNITED STATES PATENTS

| | | | |
|---|---|---|---|
| 717,378 | 12/1902 | Fourcault | 65—344 X |
| 1,593,566 | 7/1926 | Byrnes | 65—374 X |
| 1,739,936 | 12/1929 | Allen et al. | 65—344 X |
| 1,983,816 | 12/1934 | Schualbe | 65—344 X |
| 2,803,925 | 8/1957 | Klausmann | 65—374 X |
| 2,950,572 | 8/1960 | Perraut | 65—344 X |
| 3,230,060 | 1/1966 | Lippmann | 65—374 X |

DONALL H. SYLVESTER, *Primary Examiner.*

FRANK W. MIGA, *Assistant Examiner.*